(12) United States Patent
Olrik et al.

(10) Patent No.: US 7,072,667 B2
(45) Date of Patent: Jul. 4, 2006

(54) LOCATION INFORMATION SERVICE FOR A CELLULAR TELECOMMUNICATIONS NETWORK

(75) Inventors: Jakob Olrik, Copenhagen (DK); Christian Kraft, Hvidovre (DK)

(73) Assignee: Nokia Corporation, Espoo (FI)

( * ) Notice: Subject to any disclaimer, the term of this patent is extended or adjusted under 35 U.S.C. 154(b) by 485 days.

(21) Appl. No.: 10/029,940

(22) Filed: Dec. 31, 2001

(65) Prior Publication Data
US 2003/0125042 A1    Jul. 3, 2003

(51) Int. Cl.
*H04Q 7/20* (2006.01)
(52) U.S. Cl. ............ 455/456.1; 455/456.2; 455/456.3; 455/414.1; 455/422.1; 455/414.2; 455/404.1; 455/404.2; 709/203; 709/218; 709/219
(58) Field of Classification Search ........ 455/435.1, 455/422.1, 403, 456.1–457, 414.1, 466, 404.1, 455/404.2, 432.2, 432.3, 433, 550.1, 412.1, 455/412.2, 556.1, 557, 500, 517, 73, 414.4; 709/203, 218, 219, 228
See application file for complete search history.

(56) References Cited

U.S. PATENT DOCUMENTS

| 6,847,823 B1* | 1/2005 | Lehikoinen et al. ...... 455/456.1 |
| 2002/0042277 A1* | 4/2002 | Smith ..................... 455/456 |
| 2003/0060212 A1* | 3/2003 | Thomas .................. 455/456 |
| 2003/0108172 A1* | 6/2003 | Petty et al. ............ 379/142.08 |
| 2004/0203900 A1* | 10/2004 | Cedervall et al. ......... 455/456.1 |
| 2004/0249846 A1* | 12/2004 | Randall et al. ............. 707/102 |

* cited by examiner

*Primary Examiner*—Keith Ferguson
(74) *Attorney, Agent, or Firm*—Alston & Bird LLP

(57) ABSTRACT

A cellular telecommunications network provides a location information service. A landmark location server (11) has an associated data store (12) of data concerning location information associated with individual cells of the network. The server (11) is responsive to a request for location information from a mobile station (MS1). The request is sent as a SMS through the network (PLMN1). The server (11) obtains location information from the data store (12) based on the cell (C1) occupied by MS1 or another mobile station (MS2). The network is configured to send the location information as a SMS to the mobile station (MS1) that requested the information, without having to pre-register the mobile station for the location information service.

15 Claims, 4 Drawing Sheets

LOCATION INFORMATION SERVICE FOR A CELLULAR TELECOMMUNICATIONS NETWORK

BACKGROUND OF THE INVENTION

1. Field of the Invention

This invention relates to a location information service for a cellular telecommunications network, which enables individual mobile stations to receive information about their location within the network.

2. Description of the Prior Art

A number of proposals have been made to locate the position of mobile stations within a cellular telecommunications network. Each cell of the network corresponds to a particular geographical area and the cells are provided with individual identification codes. Thus, when a mobile station communicates through a particular cell, a rough estimate of its geographical location can be obtained using the cell identity. In urban situations, the cells may have an approximate diameter of the order of 200 meters.

A number of methods have been proposed to improve the locational accuracy. For example, the timing advance used in communications between the mobile station and the transmitter for the cell, can be monitored to determine whether the mobile station is relatively near to or far away from the transmitter. Also, schemes have been proposed to introduce an angular resolution around the transmitter. Other schemes involve a triangulation method using transmissions received from adjacent cells.

A location finding service is being offered commercially by Cell Point Systems AB of Kista, Sweden and reference is directed to WO 01/31966. The system is marketed under the name Finder™. Groups of subscribers can find out the location of members of the group from a mobile telephone. The user starts by defining a list of friends that they want to be able to locate, be seen by or communicate with. This involves a pre-registration procedure with the vendor of the Finder service. When a user wants to know the location of a friend, colleague or family member, the user initiates a request through their mobile telephone or computer and selects a name or names. The Finder system then locates both the user and the friend and calculates the distance and direction to the friend. The result is communicated back to the user as a text message.

A disadvantage of this system is that the user needs to pre-register with the system and only has access to the location of members of the relevant group.

SUMMARY OF THE INVENTION

The invention provides a location information service for mobile stations in a cellular telecommunications network that is provided independently of an aforesaid vendor. A request for location information may be sent from a mobile station as a short message (SMS) through the network to a location message server with an associated data store that contains location information based on the cells of the network. Location information based on the cell occupied by at least one mobile station is derived from the data store and sent through the network from the location message server as a SMS to the mobile station that requested the information. According to the invention, the service is provided without requiring pre-registration of the subscriber that uses the mobile station.

Thus, in accordance with the present invention, there is no need to form pre-registered groups of users and each individual mobile station can make use of the location information service without having to pre-register.

The request from the mobile station may be for information concerning its own location, in which case the retrieved data is sent to the mobile station that made the request.

Alternatively, the request may be for data concerning the location of another mobile station, in which case, data is retrieved from the data store based on the cell occupied by the other mobile station, and the retrieved data is sent to the mobile station that made the request. A check may be carried out to determine whether the other mobile station permits data concerning its location to be sent to others in order to provide privacy, if required.

Instead of retrieving the data from the data store, the other mobile station may itself provide the data concerning its location to the mobile station that made the request.

In another aspect, the invention provides a method of providing privacy in a location information service to mobile stations in a cellular telecommunications network. In a first mode, the invention includes sending a request for location information from a mobile station as a message through the network to a location message server, deriving location information based on the location of at least one mobile station, sending the location information to a third party application, using the third party application to develop data based on the location information, and sending the data through the network from the location message server as a message to the mobile station that requested the information. In a second mode, the invention includes inhibiting data from the third party application being sent, in response to a privacy request from said at least one mobile station.

BRIEF DESCRIPTION OF THE DRAWINGS

In order that the invention may be more fully understood, an embodiment thereof will now be described by way of example with reference to the accompanying drawings in which.

DETAILED DESCRIPTION OF THE INVENTION

Figure 1:
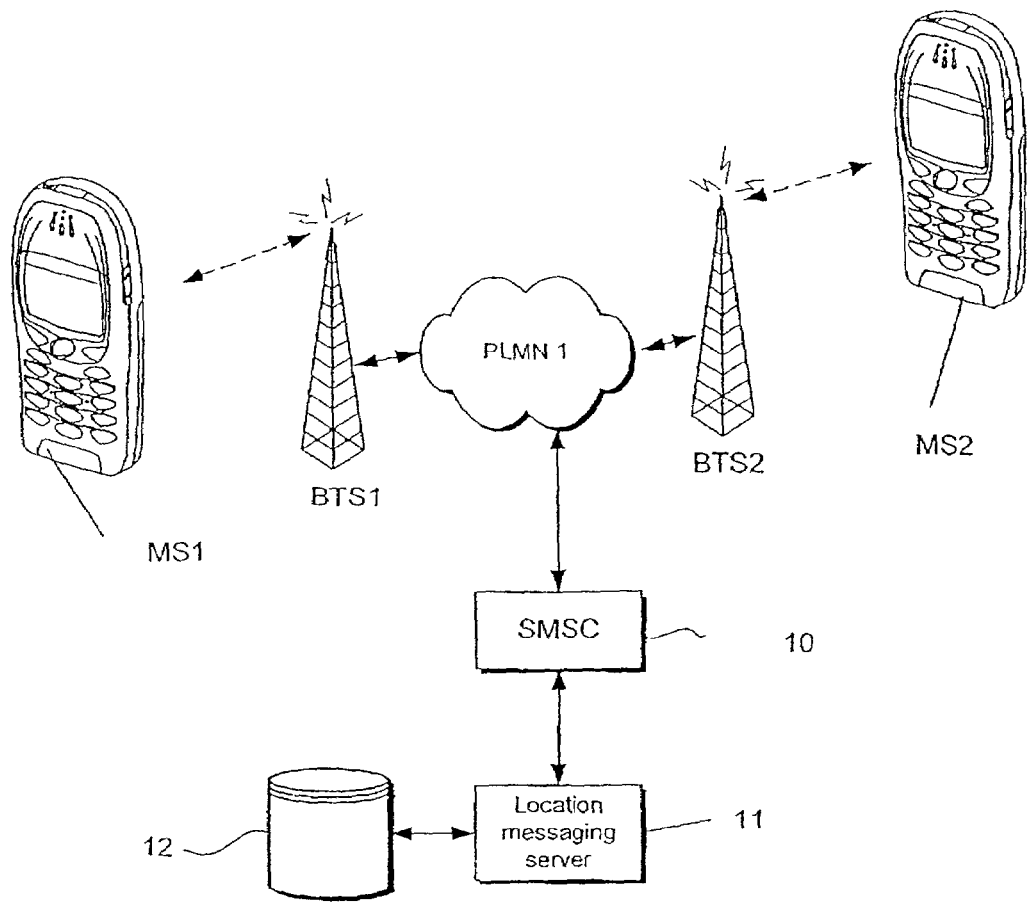
FIG. 1 is a schematic block diagram of a cellular mobile telecommunications network that includes a location information service in accordance with the invention.

FIG. 1 illustrates a public land mobile network PLMN1 that provides a cellular mobile telecommunication service to mobile stations in the form of mobile handsets MS1, MS2. The PLMN1 may be of any of the well known types such as GSM, DAMPS or UMTS and in the following description, a GSM network is described by way of example. The network is shown schematically that includes base transmitter stations BTS1, BTS2 which, as illustrated provide a radio link to the handsets MS1, MS2. PLMN 1 also includes base station controllers, mobile switching centers and a home location register as well known in the art. These features are not illustrated in the drawing and since they are very well known, will not be described further herein.

GSM networks support a short message service (SMS) by which text messages can be communicated between mobile stations, in addition to the usual speech communication. In accordance with the invention, a SMS message center (SMSC) 10 is connected to the PLMN1 to process SMS messages concerning location requests and responses, as will be explained hereinafter. The SMSC 10 is connected to a location messaging server 11 with an associated location database 12.

Figure 2:
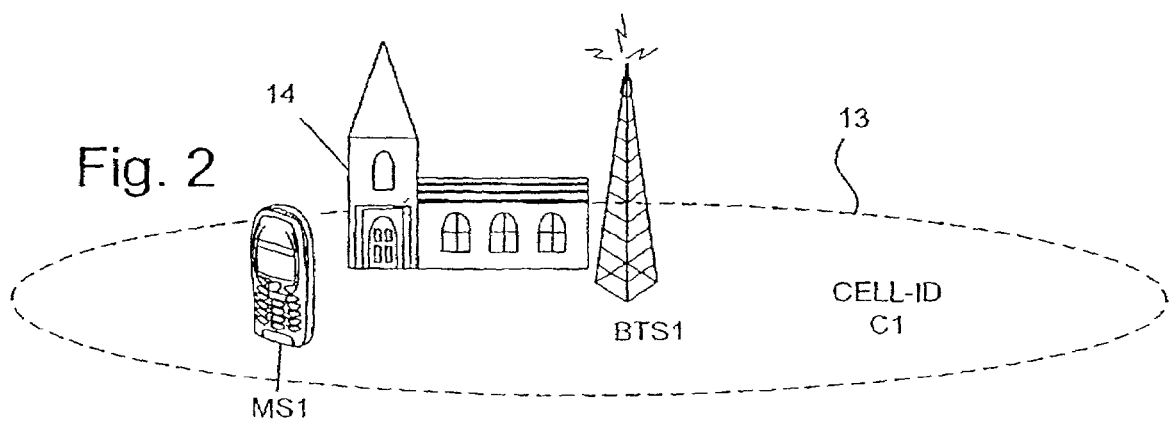
FIG. 2 is a schematic perspective view of an individual cell for the network shown in FIG. 1.

Referring to FIG. 2, the configuration of an individual cell associated with the base station controller BTS1 is shown schematically. The transmitter BTS1 has a usable range illustrated schematically by hatched outline 13. Thus, if the handset MS1 is communicating over a radio link with the network through BTS1, it is within the circular area 13 of the cell associated with BTS1. In accordance with the GSM Recommendations, each cell has an individual identity known to the network. In this example, the cell shown in FIG. 2 has a cell identity C1. Thus, when the handset MS1 communicates with BTS1, the cell identity corresponds to a rough geographical location for the handset. Typically, in urban situations, the cell 13 has a radius of 100 meters. The actual cell size depends upon the configuration of the network and as well known in the art, the cellular dimensions are made smaller in regions of high population density and larger in rural areas. As shown in FIG. 2, a distinctive landmark in the form of a church 14—St. Mark's Church—is located within the cellular area 13.

Figure 3:
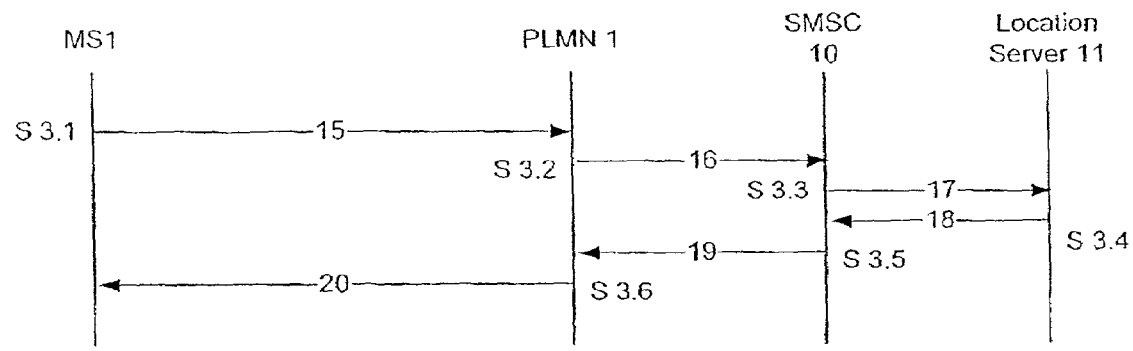
FIG. 3 is a flow diagram concerning a location request from mobile station MS1, concerning its own location.

In accordance with the invention, the user of handset MS1 can send a request to the landmark location messaging server 11 to obtain details of local landmarks in the form of a SMS. This process will now be described in more detail with reference to FIG. 3.

At step S3.1, the mobile station MS1 sends a request 15 in the form of a SMS over the radio link to BTS1 to the network PLMN 1 and thence to the SMSC 10 at step S3.2, as request 16. The request 15 contains the telephone number (MISDN) of MS1 together with category data D1, D2 or D3 discussed in more detail below. The request 16 contains the data from request 15 and the cell identity; cell C1 in this example, obtained from the network PLMN 1.

The SMSC 10 refers the request to the location messaging server 11 which refers to the database 12 in order to fetch stored data corresponding to the cell concerned, namely cell C1. The data in the database 12 may be arranged as shown in Table 1, in which landmark data corresponding to individual cells is stored, together with other data relevant to the cells such as local restaurants, railway stations and the like.

TABLE 1

| Cell Identity | D1 - Landmark data | D2 - Railway station | D3 - Restaurant data |
|---|---|---|---|
| C1 | St. Mark's Church is nearby | Newtown station | 1. Pizza Place 2. Wong's Chinese |
| C2 | | | |
| Cn | | | |

At step S3.4, the location server provides relevant data 18 to the SMSC 10 in response to the location request. For example, if the user of MS1 has requested landmark data D1, a message such as "St. Marks Church is nearby" is provided to indicate that church 15 is within cell 13. Alternatively, if the user has requested information D2 about railway stations, data "Newtown Station" may be provided. Further, if information D3 regarding restaurants has been requested, appropriate restaurant data may be supplied.

The SMSC 10 then creates a SMS text message 19 containing the retrieved data from the location messaging server 11. The resulting SMS is sent at step S3.5 to PLMN1 and thence as SMS message 20 to the MSISDN of MS1 to be received by MS1, as shown at step S3.6. The short message can be then displayed by MS1 and if appropriate stored therein for future use.

Figure 4:
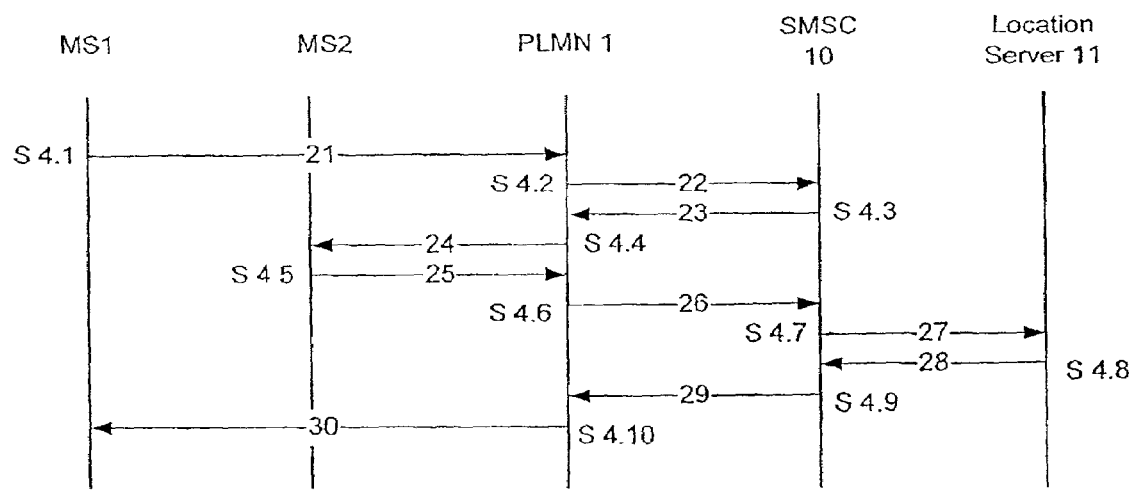
FIG. 4 is a schematic flow diagram for a process in which mobile station MS1 requests location information concerning mobile station MS2, when MS2 agrees to the request.

FIG. 4 illustrates an alternative process by which the user of mobile station MS1 obtains information concerning the location of mobile station MS2. At step S4.1 a request 21 is sent by mobile station MS1 to the network PLMN1, to be routed at step S4.2 as request 22 to SMSC 10. The requests 21 contain the MSISDNs of MS1 and MS2 together with the data D1, D2 or D3 concerning the requested category of data i.e. landmark data or other data such as railway stations or restaurants relevant to the location of mobile station MS2.

At step S4.2, reference is made to the network in order to determine the identity of the cell currently occupied by mobile station MS2. This is incorporated into the request sent as request 22 to SMSC 10.

Then, at step S4.3, SMSC 10 sends a request 23 to the PLMN 1 that is routed to mobile station MS2, as request 24, at step S4.4, in order to determine whether the user of MS2 is content to allow its positional information to be communicated to others. If MS2 is happy to release this information, a response 25 is sent at step S4.5, to the PLMN1 and forwarded as response 25 to SMSC 10 at step S4.6.

Having received clearance from MS2, the SMSC 10 at step S4.7, refers a request 27 to the location messaging server 11 in order to obtain landmark or other data pertinent to the cell occupied by MS2, which is returned as message 28 to SMSC 10, at step S4.8.

The SMSC 10 at step 4.9 assembles a SMS message 29 containing the fetched data, which is then sent to network PLMN1 and forwarded at step S4.10 as message 30 to be received by the mobile station MS1. The resulting data is displayed by MS1 to the user thus providing information about the location of MS2 to the user of MS1.

Figure 5:
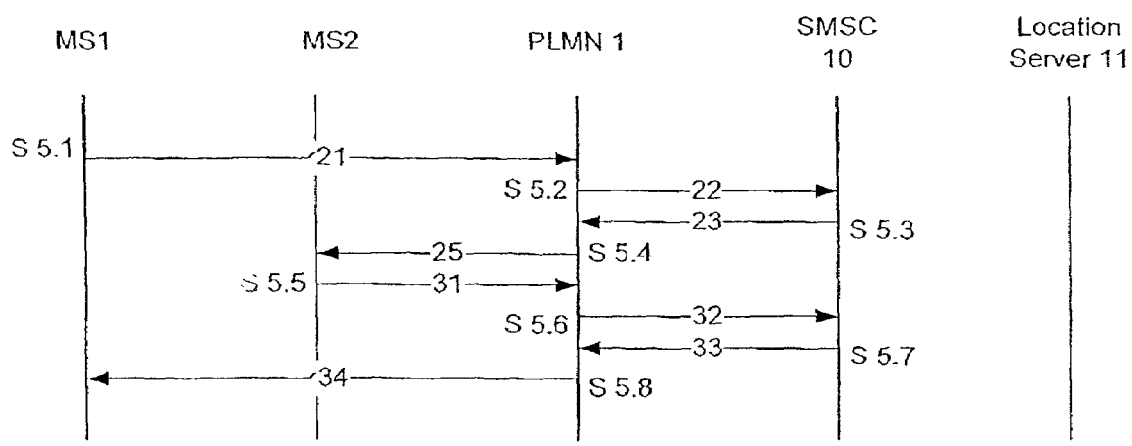
FIG. 5 corresponds to FIG. 4 in a situation where MS2 does not agree to the request made by MS1.

FIG. 5 illustrates the process when the user of MS2 does not wish its location information to be made available to others. When MS1 requests data concerning MS2, request 21 is sent at step S5.1, as previously described with reference to FIG. 4 and is sent as request 22 to SMSC 10. Then as described with reference to FIG. 4, requests 23 and 24 are sent to MS2, at steps S5.3 and S5.4, in order to request whether MS2 is prepared to release its positional information to others. At step S5.5, MS2 sends message 31 indicating that it is not prepared to release its positional information to others, and this message is transferred at step S5.6, as message 32, to the SMSC 10.

The SMSC 10 then does not refer to the location messaging server 11 but instead sends message 33 at step S5.7 to the PLMN1, to be transferred at step S5.8 as message 34 to the mobile station MS1. Message 34 comprises a SMS notifying the user of MS1 that data concerning the location of MS2 is not available.

Figure 6:
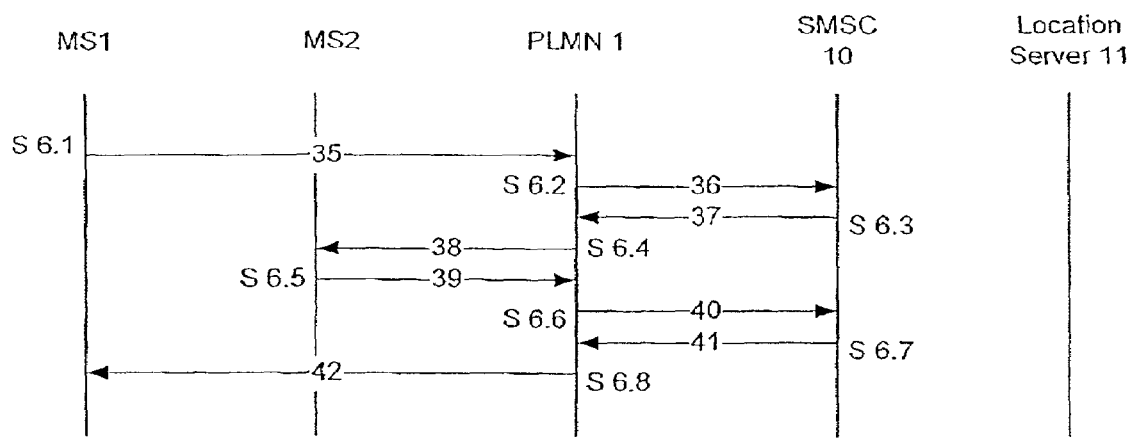
FIG. 6 corresponds to FIG. 4, in which mobile station MS2 provides the location information requested by mobile station MS1.

In another modification shown in FIG. 6, MS1 is provided with positional information concerning MS2 derived from MS2 rather than the location messaging server 11. At step S6.1, MS1 sends an SMS message 35 to the network PLMN1 containing the MSISDN of MS1 together with the MSISDN of MS2. At step S6.2 a message 36 containing the data from message 35 together with positional information concerning the cell occupied by MS2, is transmitted as SMS message 36 to SMSC 10. Then, at step S6.3 SMSC 10 routes a request message 37 to PLMN1 which in turn, at step S6.4 routes the message as message 38 to MS2.

At step S6.5, MS2 may decide to provide positional information from its own memory to MS1, in response to the request 38. For example, as previously described with reference to FIG. 3, the message 20 may be stored in the memory of MS1 for subsequent re-use. Alternatively, the stored message 20 may be modified by the user to provide more precise or personalised location information. The resulting positional information is transmitted as SMS 39 to PLMN1 and then at step S6.6 is sent as message 40 to SMSC10.

At step S6.7, the SMSC 10 develops an SMS message containing the data received from MS2 about its location. The resulting message 41 is transmitted through PLMN1 and then, as step S6.8 to MS1, as SMS 42 to be displayed by the user of MS1.

It will be understood that with the described system, there is no need to pre-register with the location service that may be provided free of charge by the network operator, or at the usual tariff for SMS messages.

The system provides information about any mobile station currently using the network, without the requirement to form groups of "friends" or other group identities. Furthermore, privacy is assured for individual users who do not wish to release their location information to others. Many modifications and variations fall within the scope of the invention. For example, more precise positional information may be achieved by the use of angular resolution within individual cells or by monitoring the timing advance setting for the individual mobile station during transmission.

Figure 7:
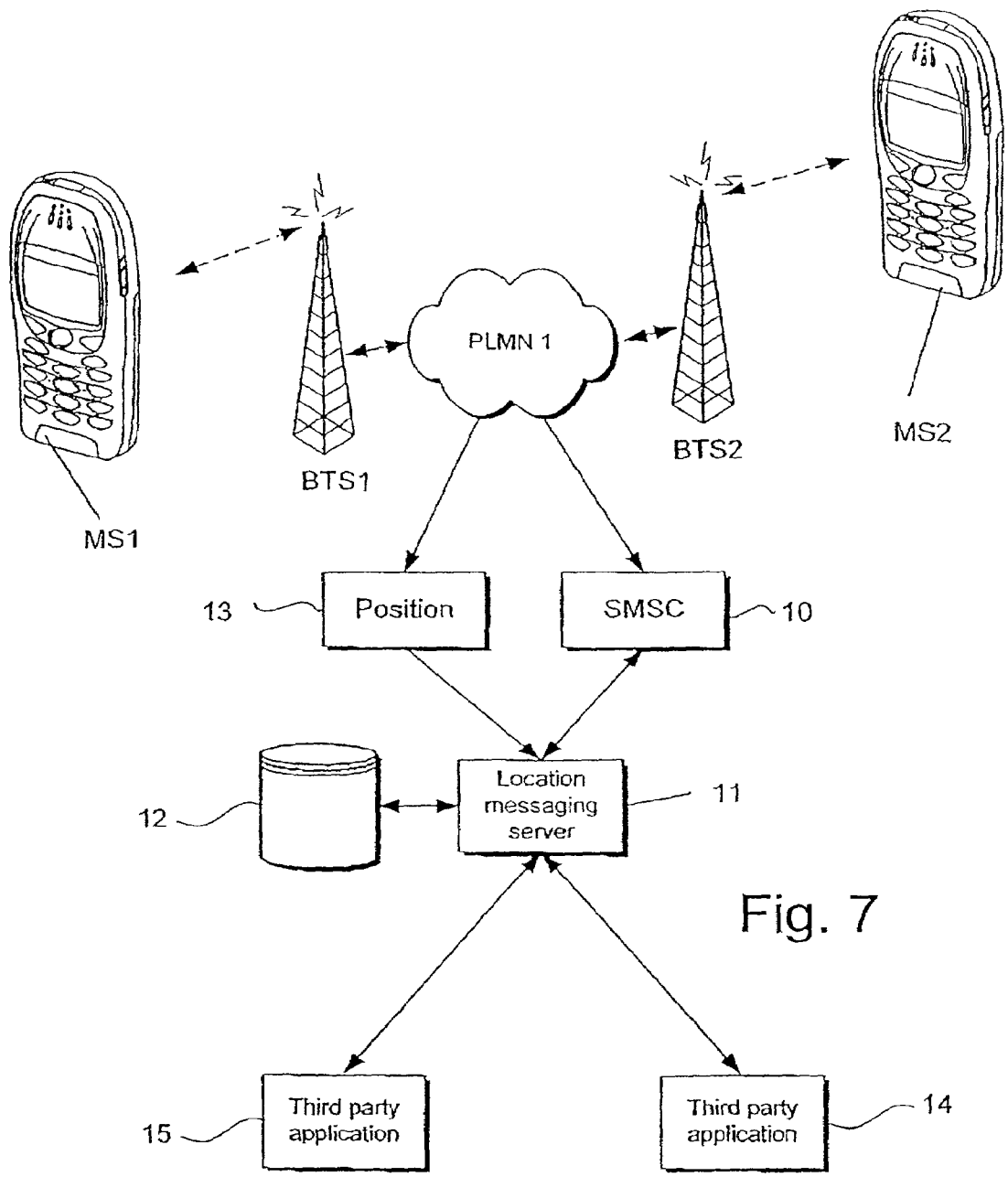
FIG. 7 is another schematic block diagram of a cellular mobile telecommunications network that includes a location information service in accordance with the invention.

Another embodiment of the invention is shown in FIG. 7. The arrangement is generally similar to that of FIG. 1 and the same reference numbers are used for corresponding components in the two Figures. The arrangement of FIG. 7 has a position server 13 additionally shown, which provides the positional data corresponding to the position of the mobile station(s). This can be based on the cell identity as previously described or may include other positional data that may be provided by the use of angular resolution within individual cells or by monitoring the timing advance setting for the individual mobile station during transmission, or possibly GPS fixes for the mobile stations, regularly updated to the server 13. This positional data is provided by the server 13 to the location messaging server 11 so that landmark messages can be supplied to the mobile stations in response to a request from the SMSC 10 as previously described.

The location messaging server 11 may also supply the positional data from the server 13 and/or the landmark data from the store 12 to third party applications illustrated schematically as applications 14 and 15. These applications may be run on separate servers as shown or as applications on the server 11. The system normally operates in a first mode whereby third party applications provide additional information to the mobile stations based on their position. For example, the third party application 14 may compute a route to be followed when either walking or travelling in a vehicle, in order to travel from the location of mobile station MS1 to MS2. This may be requested by MS1 in the manner previously described, and the computed route is forwarded by the location messaging server 11 to MS1 as series of route directions in a SMS.

Other third party applications are possible. For instance, when a mobile station requests particular landmark information, merchants may wish to provide advertising or other promotional messages to a mobile station that is provided with particular landmark data. Considering the example described with reference to FIGS. 1 and 2, Wong's Chinese restaurant may wish to send details of its special offers in response to a request from mobile stations for information about restaurants, that are provided with landmark data for St Mark's Church that is nearby the restaurant. In this situation, third party application 15 develops data about the special offer and forwards the data to the server 11 so that it is forwarded to MS1 in a SMS.

The system may be configured to operate in a second mode that ensures that the individual mobile stations are ensured privacy in respect of the third party applications. For example, if MS2 does not want its location to be made available to third party application 13, for route computations, MS2 may block the transfer of its positional information to the server 11, in the manner described with reference to FIG. 5. Similarly, if MS1 does not wish to receive promotional information from third party application 15, MS1 may provide a privacy request message to the server 11, in order to block the sending of promotional or like messages to it from server 15. Thus, privacy is assured for those individual users who do not wish to release their location information to others.

It will be understood that with the system described with reference to FIG. 7, there is no need to pre-register with the location service. Both the location service and the third party applications may be provided free of charge, or at the usual tariff for SMS messages.

The invention claimed is:

1. A method of providing a location finding service to mobile stations in a cellular telecommunications network, comprising:
    sending a request for location finding information from a mobile station as a message through the network to a location message server;
    retrieving data from a data store corresponding to the location finding information based on the cell occupied by at least one mobile station; and
    sending the data through the network from the location message server as a message to the mobile station that requested the location finding information; and wherein the method is performed without pre-registering the mobile station for the location finding service.

2. A method according to claim 1 wherein the request from the mobile station is for information concerning its own location, and the method includes sending the retrieved data to the mobile station that made the request.

3. A method according to claim 1 wherein the request from the mobile station is for data concerning the location of another mobile station, and the method includes retrieving location data from the data store based on the cell occupied by the other mobile station, and sending the retrieved data concerning the other mobile station to the mobile station that made the request.

4. A method according to claim 1 wherein the request from the mobile station is for data concerning the location of another mobile station, and the method includes checking whether the other mobile station permits data concerning its location to be sent to others.

5. A method according to claim 1 wherein the request from the mobile station is for data concerning the location of another mobile station, and the method includes sending location finding information from the other mobile station to the mobile station that made the request.

6. A method according to claim 1 including re-directing the message from the mobile station that requested the location finding information, to another mobile station.

7. A method according to claim 6 including displaying the message at he mobile station that requested the location finding information, modifying the message and then re-directing the modified message to another mobile station.

8. A mobile station configured to communicate with a network to perform the method claimed in claim 1.

9. A mobile telecommunications network configured to perform the method claimed in claim 1.

10. A cellular telecommunications network with a location finding service, comprising a location server having an associated data store of data concerning location finding information associated with individual cells of the network, the server being responsive to a request for the location finding information from a mobile station sent as a message through the network and operable to derive data from the data store corresponding to the location finding information based on the cell occupied by at least one mobile station, the network being configured to send the data as a message to the mobile station that requested the location finding information, without pre-registering the mobile station for the location finding service.

11. A network according to claim 10 including an SMS message center to receive location finding request messages from the mobile stations, to send the requests to the server and to receive retrieved data from the server to be sent as an SMS to a mobile station.

12. A method of operating a mobile station to receive location information from a location finding service in a cellular telecommunications network, comprising:

sending a request for location finding information from a mobile station as a message through the network to a location message server; and receiving from the location message server, a message containing the location finding information based on the cell occupied by at least one mobile station; and wherein the method is performed without pre-registering the mobile station for the location finding service.

13. A mobile station for receiving location finding information from a location finding service in a cellular telecommunications network, comprising:

circuitry operable to send a request for location finding information from a mobile station as a message through the network to a location message server; and circuitry operable to receive from the location message server, a message containing location finding information based on the cell occupied by at least one mobile station; and wherein provision of the location finding information being made without pre-registering the mobile station with the location finding service.

14. A mobile station according to claim 13 including a display operable to display the message.

15. A mobile station according to claim 14 including circuitry operable to send the received message to another mobile station.

* * * * *